United States Patent Office 3,702,825
Patented Nov. 14, 1972

3,702,825
AUXILIARIES FOR CLEANING CYLINDERS AND ROLLERS OF DYEING AND DRYING AGGREGATES IN TEXTILE PLANTS
Hans-Ulrich von der Eltz and Gerhard Weckler, both % Farbwerke Hoechst AG, Frankfurt am Main, Germany
No Drawing. Filed Oct. 17, 1969, Ser. No. 867,363
Claims priority, application Germany, Oct. 22, 1968,
P 18 04 414.9
Int. Cl. C11d
U.S. Cl. 252—89                               5 Claims

ABSTRACT OF THE DISCLOSURE

An auxiliary composition comprising a mixture of an oxalkylated aliphatic alcohol and a polyalkylene glycol. This auxiliary composition may be used for cleaning heavily soiled cylinders and rollers of dyeing and drying aggregates in textile plants.

---

The present invention provides a mixture of auxiliary agents to be used for cleaning cylinders and rollers of dyeing and drying aggregates in textile plants.

A great problem in the textile industry is to overcome the heavy soiling of the padding rollers and, especially, of the cylinders and rollers in drying aggregates caused, during continuous dyeing and printing processes, by spotting or smearing dye preparations. It is, therefore, necessary to interrupt the process after a certain time of operation of the plants, especially when changing the color shade, and to remove the layer formed, preferably, on the guide rollers of the drying aggregates but often also on the padding rollers by the dyes and auxiliaries used, since otherwise even dyeing and printing of the goods are no longer ensured.

In practice, the above inconveniences are mainly due to the use of water-insoluble dyes, such as inorganic or organic pigment dyes, disperse dyes, vat dyes and developing dyes, in combination with the auxiliaries necessary for each individual process.

Therefore, attempts have already been made to remove the layer on the padding rollers and the rollers of the drying aggregates which deteriorates the quality of the dyeings and prints by means of brushes with the aid of solvents.

On the one hand, however, this method requires a lot of time since it is necessary to cool down the drying aggregates, prior to the cleaning operation, to temperatures which allow access to the plant.

On the other hand, the drying devices have anyway to be cooled in order to prevent the risk of inflammation or even explosion due to the use of solvents.

Moreover, owing to their toxicity, the use of most solvents for this purpose risks damaging the health of those engaged in the cleaning operation. Even when used at room temperature the bad smell of most solvents is extremely troublesome.

Furthermore, a large number of solvents to be used for cleaning has a swelling effect so that they cannot be used for such a treatment of soiled rubber rollers (as used in padding machines).

It has now been found that the above disadvantages connected with the removal of the remnants of dye preparations adhering to dyeing and drying aggregates can be avoided using, for the cleaning of the cylinders and rollers, a mixture of auxiliary agents comprising:

(A) an oxalkylated aliphatic alcohol, and
(B) a polyalkylene glycol.

The ratio of the two components of the mixture to be used according to the invention varies within relatively wide limits; it should advantageously comply with the requirements of practice. Thus, both component (A) and component (B) may be used in excess. Especially suitable is a mixture of equal parts of (A) and (B).

As component (A)—oxalkylated aliphatic alcohol—there may be used addition compounds of from 1 to 15 mols of an alkylene oxide, preferably ethylene oxide, on 1 mol of a linear or branched aliphatic alcohol having, preferably, from 10 to 20 carbon atoms.

Component (B)—polyalkylene glycol—comprises polyethylene glycols, polypropylene glycols or mixed ethers of polyethylene glycols and polypropylene glycols, preferably polyethylene glycols. The molecular weight of these compounds may vary between about 300 and 1,000, preferably between 500 and 800.

For removing the remnants of dye preparations soiling the apparatus the mixture may be applied by hand with the aid of brushes soaked with the auxiliary mixture at plant temperatures between 20 and 60° C., the mixture being either highly concentrated or diluted with water, depending on the thickness of the layer to be removed. Even heavily soiled cylinders and rollers may easily be cleaned in this manner without involving—as solvents hitherto used for this purpose do—damage to the health of the cleaning personnel nor troublesome odor, nor adversely affecting the casing of the cylinders.

It may, however, be especially advantageous to use the mixture of auxiliaries of the invention for a mechanical cleaning of cylinders and rollers soiled by dye preparations in padding machines and drying aggregates, without having to reduce the temperatures in the aggregates necessary for the drying and fixing of dyeings and prints. This mechanical operation saves considerable time and costs especially in continuous dyeing and printing processes.

Mechanical cleaning may, for example, be carried out by sewing a cloth strip made of cellulose fibers, for example cotton, onto the end of a textile material to be padded, dried and fixed. After the padding process the dye bath is let off the padding machine, the auxiliary mixture of the invention is fed in the padding trough in an amount of from 20 to 200 cc./l., preferably from 50 to 120 cc./l. of water, depending on the degree of soiling of the cylinders and rollers, and then the plant is started again. During the cleaning operation the squeezing effect should be as small as possible to ensure an ample liquor absorption of the lagging cloth strip and thus a good liquor transfer to the rollers and cylinders of the drying aggregates to be cleaned.

The following example serves to illustrate the effect of the invention on a laboratory device under conditions which are as similar as possible to those of practice.

EXAMPLE

With the use of a laboratory-scale twin-roller padding machine having a trough capacity of about 2 liters a polyester staple fiber fabric was passed, as an endless band, successively through the trough of the padding machine and the squeezing rollers into a drying cabinet, then over a steel cylinder installed therein and finally returned to the padding machine. To this effect, the textile material was treated on the padding machine in an aqueous padding bath containing 20 g./l. of the disperse dye of the formula

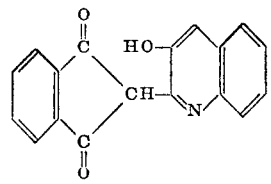

and 100 g./l. of an aqueous alginate thickening (40:1,000), at about 20° C. and with a squeezing effect of 80–90%, calculated on the weight of the dry fabric, and was then passed, as disclosed above—through the drying cabinet heated to 170° C. The transport speed of the material was about 7 meters per minute. After about 45 minutes the padding and guide rollers, especially, however, the hot steel cylinder in the drying cabinet were very heavily soiled. (Cleaning thereof by brushing is very time-consuming since it can only be done after cooling and does not furnish satisfactory results.)

After the dye bath had been let off and a new cotton "endless band" had been inserted, the trough of the padding machine was filled with a bath containing, per liter of water, 100 g. of a mixture comprising 40 cc. of a polyethylene glycol (molecular weight 600),
40 cc. of an addition compound of 8 mols of ethylene oxide on 1 mol of isotridecyl alcohol and
22 cc. of water, and the device was started again. After an operation time of about 8 minutes at a temperature in the device of from 60 to 80° C. and a transport speed of 7 meters per minute the solid cylinders and rollers were prefectly clean again. After rinsing with warm and cold water the endless band could be used again.

The same cleaning effect could not be achieved without using the mixture of auxiliaries of the invention even after a long treatment with water or brushing of the cylinders and rollers.

We claim:

1. In a process for cleaning cylinders and rollers employed in textile plants for dyeing and drying textiles, the improvement of which comprises applying to said cylinders and rollers a mixture consisting essentially of
   (A) An addition compound of 1 to 15 mols of ethylene oxide and 1 mol of a linear or branched alkanol having 10 to 20 carbon atoms in said alkanol and
   (B) a polyethylene glycol, a polypropylene glycol or mixed ethers of polyethylene glycols and polypropylene glycols having a molecular weight between about 300 and 1,000.

2. The process as claimed in claim 1, wherein component (A) is an addition product of 8 mols of ethylene oxide on 1 mol of isotridecyl alcohol.

3. The process as claimed in claim 1, wherein the two components (A) and (B) of the mixture are in equal portions.

4. The process as claimed in claim 1, wherein said mixture is applied in an amount of 20 to 200 cc./l. of water.

5. The process as claimed in claim 1, wherein said mixture is applied in an amount of 50 to 120 cc./l. of water.

References Cited

UNITED STATES PATENTS

| | | | |
|---|---|---|---|
| 2,508,036 | 5/1950 | Kosmin | 260—615 |
| 2,674,619 | 4/1954 | Ludsted | 260—485 |
| 2,806,001 | 9/1957 | Fong, et al. | 252—161 |
| 2,934,568 | 4/1960 | Barker | 260—615 |
| 2,943,058 | 6/1960 | Cook | 252—153 |
| 3,419,500 | 12/1968 | Rytter et al. | 252—89 |
| 2,835,550 | 5/1950 | Laucius et al. | 8—93 |
| 2,965,678 | 12/1960 | Sundberg et al. | 8—93 X |
| 3,392,083 | 7/1968 | Illingworth | 252—351 X |
| 3,549,539 | 12/1970 | Mallows | 252—89 X |

OTHER REFERENCES

"Glycol," pp. 10–11, Union Carbide Co. (1964).
"Carbowax," p. 6, Union Carbide Co.

MAYER WEINBLATT, Primary Examiner

U.S. Cl. X.R.

134—42; 252—73, 170, 171, 352

UNITED STATES PATENT OFFICE
CERTIFICATE OF CORRECTION

Patent No. 3,702,825         Dated November 14, 1972

Inventor(s) Hans-Ulrich von der Eltz et al.

It is certified that error appears in the above-identified patent and that said Letters Patent are hereby corrected as shown below:

In the Heading:

After the identification of the inventors, insert --, Assignors to Farbwerke Hoechst Aktiengesellschaft vormals Meister, Lucius & Bruning, a corporation of Germany.--

Signed and sealed this 27th day of March 1973.

(SEAL)
Attest:

EDWARD M. FLETCHER, JR.
Attesting Officer

ROBERT GOTTSCHALK
Commissioner of Patents